United States Patent [19]
Aii et al.

[11] Patent Number: 5,626,891
[45] Date of Patent: May 6, 1997

[54] COMPOUND FOR POULTRY FEEDS AND A METHOD FOR FEEDING POULTRY WITH THE SAME

[75] Inventors: Takamitsu Aii; Fuminori Terada; Makoto Muraoka, all of Kikuchi-gun; Masanobu Tsurusaki, Chikushino; Harumi Ono, Chikushino; Yuji Kojima, Chikushino; Tadakatsu Murakami; Masaharu Matsuzaki, both of Kikuchi-gun; Hirotoshi Hayasawa, Funabashi; Takashi Shimizu; Shuzo Ishida, both of Yokohama; Toshihiro Nakamura, Higashikurume, all of Japan

[73] Assignees: Japan as represented by Director General of Kyusyu National Agricultural Experiment Station of Ministry of Agriculture, Forestry, and Fisheries, Kumamoto; Fukuoka Prefectural Government, Fukuoka; Kumamoto Prefectural Government, Kumamoto; Morinaga Milk Industry Co., Ltd., Tokyo; Taiyo Yushi K.K., Yokohama, all of Japan

[21] Appl. No.: 150,066

[22] PCT Filed: Apr. 1, 1993

[86] PCT No.: PCT/JP93/00416

§ 371 Date: Mar. 31, 1994

§ 102(e) Date: Mar. 31, 1994

[87] PCT Pub. No.: WO93/19618

PCT Pub. Date: Oct. 14, 1993

[30] Foreign Application Priority Data

Apr. 1, 1992 [JP] Japan .................................. 4-108577

[51] Int. Cl.$^6$ .................................. A23K 1/02; A23K 1/18
[52] U.S. Cl. .................................. 426/2; 426/635; 426/807
[58] Field of Search .................................. 426/2, 807, 635, 426/601; 514/558, 560

[56] References Cited

U.S. PATENT DOCUMENTS

| | | | |
|---|---|---|---|
| 3,051,571 | 8/1962 | Pergament | 426/454 |
| 3,420,672 | 1/1969 | Appleman | 426/658 |
| 3,733,405 | 5/1973 | Derrig et al. | 426/335 |
| 4,062,988 | 12/1977 | DeSantis | 426/807 |
| 4,153,735 | 5/1979 | Mommer | 426/2 |
| 4,560,561 | 12/1985 | Henderson | 426/807 |
| 4,642,317 | 2/1987 | Polmquist | 514/558 |

FOREIGN PATENT DOCUMENTS

| | | |
|---|---|---|
| 1476511 | 3/1967 | France . |
| 58-47442 | 3/1983 | Japan . |
| 58-35066 | 7/1983 | Japan . |
| 852189 | 10/1960 | United Kingdom . |
| 2116821 | 10/1983 | United Kingdom . |

OTHER PUBLICATIONS

Manfredini, M. et al., "Distillery Effluents as Animal Feeds: the Use of Condensed Beef Molasses Stillage (CBMS) in Broiler Feeding", Journal of Animal Feed Science and Technology, 1980 vol. 5, Issue 3, pp. 233–239.

Hawley's Condensed Chemical Dictionary, 10th Ed., Van Nostrand Reinhold Co., Inc., 1981, p. 618.

(List continued on next page.)

*Primary Examiner*—Daniel Stemmer
*Attorney, Agent, or Firm*—Oblon, Spivak, McClelland, Maier & Neustadt, P.C.

[57] ABSTRACT

The present invention provides a compound for poultry feeds characterized by making it possible to increase the content of a highly unsaturated fatty acid in the yolk of eggs laid, decrease the percentage of breakage of eggs laid and extend the egg-laying period, and containing a long-chain unsaturated fatty acid calcium salt having carbon atoms of more than 18 alone, or said long-chain unsaturated fatty acid calcium salt together with a molasses, a browning material formed by heating saccharide, a browning material formed by heating saccharide and amino acids and the like as effective ingredients, and a method for feeding poultry characterized by compounding said compound with a poultry feed, and feeding the resultant feed to poultry.

6 Claims, No Drawings

OTHER PUBLICATIONS

Kachiku Eiyogaku (Translated title: Nutritional Studies upon Poultry), Hiroshi Morimoto, Yokendo, 1971.

Nippon Chikusangakkai ho (Translated title: The Japanese Journal of Zootechnical Science), vol. 46, No. 5, p. 251, 1975.

Nihon Nogeikagakukai shi (Translated title: Japan Agricultural Chemistry Journal), vol. 43, No. 7, p. 484, 1969.

Journal of Food Science, vol. 40, No. 3, p. 460, 1975.

Chemical Abstracts, vol. 98, Article No. 33211W, 1983.

COMPOUND FOR POULTRY FEEDS AND A METHOD FOR FEEDING POULTRY WITH THE SAME

FIELD OF THE INVENTION

The present invention relates to a compound for poultry feeds characterized by making it possible to increase the content of a highly unsaturated fatty acid in the yolk of eggs laid, decrease the percentage of breakage of eggs laid and extend the egg-laying period by compounding it with a feed for poultry, particularly with a feed for egg-laying hens, and feeding the resultant feed to them, and a method for feeding poultry, particularly egg-laying hens, employing said compound.

In the present specification, a long-chain unsaturated fatty acid means an unsaturated fatty acid consisting essentially of fatty acids, carbon atoms of at least 18, and percentages show the values expressed by weight % except those of egg-laying and breakage.

BACKGROUND OF THE ART

For egg producers, the egg-laying period and the breakage of eggs laid are important problems in management, and it is an important and urgent problem to keep the egg-laying period as long as possible and decrease the percentage of breakage (percentage of the number of broken eggs based on the number of all laid eggs; referred to as the same hereinafter).

An egg contains about 2 g of calcium, most of which is contained in an eggshell as calcium carbonate, and it is known that the demand of calcium for egg-laying hens is more than twice that of non-egg-laying hens [Nutritional Studies up on Poultry (Kachiku Eiyogaku), Hiroshi Morimoto, Yokendo, 1971]. Hence, various attempts of increasing the feeding amount of calcium to egg-laying hens have been made for the purpose of fortifying eggshells, and, for example, a method of allowing a feed for poultry to contain 0.5% or more of middle-chain fatty acid calcium salts having carbon atoms of 8–12 is disclosed (Official Gazette of Japanese Laid-Open Patent Publication No. 2-177865/1990).

On the other hand, in order to fortify long-chain unsaturated fatty acids such as linoleic acid and linolenic acid in eggs according to a recent health food boom, an attempt of feeding oils and fats containing these fatty acids in a large amount or these fatty acids themselves to egg-laying hens has been made.

For example, a method of compounding linseed oil, safflower oil and the like with feeds [The Japanese Journal of Zootechnical Science (Nippon Chikusangakkai no), vol. 46, No. 5, p. 251, 1975], a method of giving egg-laying hens water having an ω-3-type highly unsaturated fatty acid emulsified therein (Official Gazette of Japanese Laid-Open Patent Publication No. 60-105471/1985), and a method of feeding them a feed having a high content of an α-linolenic fatty acid (Official Gazette of Japanese Laid-Open Patent Publication No. 63-237745/1988) are disclosed, and it is known that by feeding these oils and fats or fatty acids can be remarkably increased the content of long-chain unsaturated fatty acids in the lipid of eggs.

On the other hand, it is known that a Maillard-type browning material formed by heating saccharide and an amino acid, and a caramel-type browning material formed by heating saccharide have an antioxidative action [e.g., Japan Agricultural Chemistry Journal (Nihon Nogeikagaku-kai shi), vol. 43, No. 7, p. 484, 1969; Journal of Food Science, vol. 40, No. 3, p. 460, 1975; Chemical Abstracts, vol. 98, Article No. 33211W, 1983], and in addition, it is known that a mixture of caramel, hemicellulose, xylose and lignosulfate is used as a stabilizer of ethylenediamine dihydro iodide in storing, and that a mixture of said mixture with ethylenediamine dihydro iodide at a ratio of 1:1 (by weight) is used as a feed (Specification of U.S. Pat. No. 3,733,405, 1973).

Moreover, it is conventionally known to utilize molasses for feeds for the purpose of enriching the taste of poultry (e.g., Official Gazette of Japanese Patent Publication No. 58-35066/1983).

The method of allowing a feed for poultry to contain middle-chain fatty acid calcium salts having carbon atoms of 8–12, which is described in the above prior art, does not use long-chain unsaturated fatty acid calcium salts (in the above Official Gazette of Japanese Laid-Open Patent Publication No. 2-177865/1990, page 518, from right upper column, line 7 from the bottom, to left lower column, line 2, there is clearly described that long-chain fatty acid calcium salts cannot decrease the percentage of breakage of eggs), and hence it is impossible to fortify long-chain unsaturated fatty acids such as linoleic acid and linolenic acid in the lipid of eggs by employing said method. On the other hand, according to the method mentioned above in which, in order to fortify long-chain unsaturated fatty acids such as linoleic acid and linolenic acid in the lipid of eggs, oils and fats containing these fatty acids in a large amount or these fatty acids themselves are fed, the work of feeding hens fatty acids or oils and fats is complicated, and besides the method cannot decrease the percentage of breakage of eggs. In addition, oils and fats containing a large amount of long-chain unsaturated fatty acids have a defect that they are readily oxidized and a long-chain unsaturated fatty acid calcium salt is more readily oxidized than oils and fats containing a large amount of long-chain unsaturated fatty acids, and hence it has had various problems to compound it with feeds for poultry.

Further, the above prior arts have neither example of using a long-chain unsaturated fatty acid calcium salt for the purpose of reducing the percentage of breakage of eggs laid and fortifying a long-chain unsaturated fatty acid in the yoke of eggs laid nor example of using said calcium salt together with a molasses, a browning material formed by heating saccharide, a browning material formed by heating saccharide and amino acids or a mixture thereof mixed at an optional ratio (hereinafter they are referred to as browning materials as a whole at times), and further, it is not known at all that the egg-laying period may be extended by using them together.

DISCLOSURE OF THE INVENTION

The present inventors have made assiduous studies aiming at solving the above defects and problems in view of the above prior arts and as a result, have found that by compounding long-chain unsaturated fatty acid calcium salts alone or said long-chain unsaturated fatty acid calcium salt and browning materials with a feed for poultry, it becomes possible to extend the egg-laying period of poultry, improve the percentage of egg-laying and reduce the percentage of breakage of eggs and at the same time to fortify long-chain unsaturated fatty acids such as linoleic acid and linolenic acid in the yolk, which has led to the accomplishment of the present invention.

An object of the present invention is to provide a novel compound for feeds to be compounded with feeds for poultry, particularly with feeds for egg-laying hens.

One of other objects of the present invention is to provide a method for feeding poultry, particularly egg-laying hens, characterized by compounding said compound with a feed, and feeding the resultant feed to poultry.

One of other objects of the present invention is to make it possible to extend the egg-laying period of poultry by using the above compound.

One of other objects of the present invention is to improve the percentage of egg-laying (percentage of the number of eggs laid per day based on the number of hens fed; referred to as the same hereinafter), and at the same time to reduce the percentage of breakage of eggs by employing the above compound.

Further, one of other objects of the present invention is, together with the above objects, to accomplish the fortification of long-chain unsaturated fatty acids such as linoleic acid, linolenic acid and docosahexaenoic acid in the yoke of eggs laid and produce eggs having high added values simultaneously.

One of other objects of the present invention is as described further in the following preferable embodiments.

The present invention solving the above problems relates to a compound for poultry feeds characterized by containing long-chain unsaturated fatty acid calcium salts consisting essentially of fatty acid calcium salts having carbon atoms of 18 or more as an effective ingredient.

In addition, the present invention solving the above problems relates to a compound for poultry feeds characterized by containing, as effective ingredients, at least two ingredients of more than 80% (by weight) of long-chain unsaturated fatty acid calcium salt consisting essentially of fatty acid calcium salts having carbon atoms of 18 or more and less than 20% (by weight) of a molasses, a browning material formed by heating saccharide, a browning material formed by heating saccharide and amino acids or a mixture thereof mixed at an optional ratio.

Besides, the present invention solving the above problems relates to a method for feeding poultry characterized by compounding at least 0.5% (by weight) of long-chain unsaturated fatty acid calcium salt consisting essentially of fatty acid calcium salts having carbon atoms of 18 or more with a feed for poultry, and feeding the resultant feed to poultry.

Moreover, the present invention solving the above problems relates to a method for feeding poultry characterized by compounding at least 0.5% (by weight) of a mixture, in terms of long-chain unsaturated fatty acid calcium salts, of at least two ingredients of more than 80% (by weight) of long-chain unsaturated fatty acid calcium salts consisting essentially of fatty acid calcium salts having carbon atoms of 18 or more and less than 20% (by weight) of a molasses, a browning material formed by heating saccharide, a browning material formed by heating saccharide and amino acids or a mixture thereof mixed at an optional ratio with a feed for poultry, and feeding the resultant feed to poultry.

Next, the present invention is described in detail.

As long-chain unsaturated fatty acid calcium salts to be used in the present invention, any proper one can be used, irrespective of kind and form of it, so far as it is a long-chain unsaturated fatty acid calcium salt consisting essentially of fatty acid calcium salts having carbon atoms of 18 or more, and said calcium salt is produced by ordinary methods, for example, a metathesis method, as follows [Tokiyuki Yoshida, et al., Properties and Application of Metal Soap (kinzokusekken no Seishitsu to Oyo), p. 15, Saiwai Shobo, 1988]. Oils and fats having a long-chain unsaturated fatty acid such as linseed oil, soybean oil and corn oil as a main constitutional fatty acid, and having an iodine value of 50 or more, are saponified to form a fatty acid alkaline soap, and an aqueous solution of calcium chloride is added therein to react with said soap, and the formed fatty acid calcium salt is separated, washed, dehydrated and dried to produce a powdery long-chain unsaturated fatty acid calcium salt.

In this manufacturing process, a predetermined amount of a browning material may be mixed in advance to carry out the reaction of the formation of the fatty acid calcium salt.

Molasses to be used in the present invention is commercially available, and a browning material formed by heating saccharide, a browning material formed by heating saccharide and amino acids or a mixture thereof mixed at an optional ratio can be produced as below. The browning material formed by heating saccharide can be produced by heating saccharide (e.g., glucose, lactose and the like) at normal temperature by a known method (e.g., at 100° C. for 2–6 hours). The formed material has a brown tone, and as a commercially available product can be exemplified caramel preferably.

The browning material formed by heating saccharide and amino acids can be produced by heating monosaccharides and amino acids at normal temperature by a known method, and a commercially available product can also be used. Mixtures of these browning materials mixed at an optional ratio can also be used in the present invention.

The compound for poultry feeds according to the present invention is produced as below. A predetermined amount of the above browning material is compounded with a powder of the above long-chain unsaturated fatty acid calcium salt, and the mixture is mixed uniformly by means of a mixer. As another method of production, a predetermined amount of a browning material may be compounded in the process of producing a long-chain unsaturated fatty acid calcium salt as mentioned above. In any method, the compounding amount of a browning material is less than 20%, preferably 0.5–10%.

The compound for poultry feeds according to the present invention is produced as above, and other feed ingredients such as alfalfa meal may be compounded at the same time if needed.

The method for feeding poultry according to the present invention is carried out by compounding at least 0.5% of above long-chain unsaturated fatty acid calcium salts or at least 0.5% of a mixture of the above long-chain unsaturated fatty acid calcium salts and a browning material in terms of a long-chain unsaturated fatty acid calcium salt with a commercially available poultry feed, and feeding the resultant feed to poultry by an ordinary method. As is apparent from Experiments described later, when the compounding ratio of said long-chain unsaturated fatty acid calcium salt is less than 0.5%, or when the compounding ratio of said compound is less than 0.5% in terms of a long-chain unsaturated fatty acid calcium salt, the reduction in the percentage of breakage of eggs is small, and hence it is undesirable. On the other hand, when the compounding ratio of said long-chain unsaturated fatty acid calcium salt, or the compounding ratio of said compound is beyond 10% in terms of a long-chain unsaturated fatty acid calcium salt, the reduction in the percentage of breakage of eggs according to the increase of the compounding amount cannot be anticipated, and it may affect poultry physiologically undesirably, and hence it is undesirable. Accordingly, in the method of the present invention, at least 0.5% of said long-chain unsaturated fatty acid calcium salt or at least 0.5% of said compound in terms of a long-chain unsaturated fatty acid calcium salt, preferably 2–6% of either of them, is compounded with a poultry feed.

Next, the present invention is described in detail according to Experiments.

EXPERIMENT 1

This experiment was carried out for the purpose of examining the reduction in the percentage of breakage of eggs according to the compounding ratio of the compound for feeds.

1) Preparation of a Sample

According to the same method as in Example 2, a compound for a poultry feed comprising long-chain unsaturated fatty acid calcium salts obtained from linseed oil, in which about 90% of the constitutional fatty acid is a long-chain unsaturated fatty acid, was prepared.

This compound for a poultry feed was uniformly mixed with a commercially available poultry feed (manufactured by Toyohashi Shiryo) at a ratio of 5% to prepare a sample feed. As a control feed, the same commercially available feed without the compound for a poultry feed was used.

2) Method of the Experiment 200 of 316-day-old white leghorn egg-laying hens were divided into 2 groups, and the sample feed and the control feed were fed to them for 77 days. The percentage of breakage of eggs for one week from the 71st day was examined visually regarding each group at the time of collecting eggs.

3) Results of the Experiment

The results of the experiment were as shown in Table 1. As is apparent from Table 1, while the average percentage of breakage of eggs regarding the group to which had been fed the sample feed mixed with the compound for a poultry feed was 0.4%, that of the control group was 1.8%, and thus the percentage of breakage of eggs regarding the group to which the sample feed had been fed was reduced to less than ¼, and it was recognized that the percentage of breakage of eggs was remarkably reduced. Incidentally, even when experiments were carried out, changing the kinds of compounds for a poultry feed and the compounding ratios, almost equivalent results were obtained. In Table, the date of collecting eggs shows the number of days from the starting of feeding to collecting eggs.

TABLE 1

| Effect upon the Reduction of the Percentage of Breakage of Eggs | | | | | | | | |
|---|---|---|---|---|---|---|---|---|
| Date of collecting eggs | 71 | 72 | 73 | 74 | 75 | 76 | 77 | Average |
| Sample group | 1.4 | 0 | 1.5 | 0 | 0 | 0 | 0 | 0.4 |
| Control group | 1.5 | 1.6 | 2.2 | 1.8 | 1.9 | 2.0 | 1.7 | 1.8 |

(Note)
Numerical values show the percentage of breakage of eggs (%).

EXPERIMENT 2

This experiment was carried out for the purpose of examining the percentage of egg-laying and the extension of the egg-laying period according to the compound for a poultry feed.

1) Preparation of a Sample

A compound for a poultry feed was prepared according to the same method as in Example 1, and the compound was mixed uniformly with a commercially available poultry feed (manufactured by Toyohashi Shiryo) at a ratio of 5% to prepare a sample feed. As a control feed, the same commercially available feed without the compound for a poultry feed was used.

2) Method of the Experiment

After feeding the sample feed to 100 of 316-day-old white leghorn egg-laying hens for 86 days, they were divided into 2 groups, and the sample feed and the control feed were fed to them for 28 days. The percentage of egg-laying was examined regarding each group every day for 14 days from two weeks after the division. Incidentally, the percentage of egg-laying was calculated as percentage of the number of eggs laid per day based on the number of hens fed.

3) Results of the Experiment

The results of the experiment were as shown in Table 2. As is apparent from Table 2, the average percentage of eggs laid regarding the group to which had been fed the control feed was 81.8%, that of the control group was 86.6%, and thus a significant difference was recognized at a level of significance of 0.5%. It is a surprising fact in this field that over-300-day-old hens keep a high percentage of egg-laying of more than 85% only by feeding the compound for a poultry feed to them according to the present invention. Incidentally, even when experiments were carried out, changing the kinds of compounds for a poultry feed and the compounding ratios, almost equivalent results were obtained.

TABLE 2

| Effect upon the Percentage of Egg-Laying and the Extension of the Egg-Laying Period | | | | | | |
|---|---|---|---|---|---|---|
| | Date of collecting eggs | 15 | 16 | 17 | 18 | 19 |
| Percentage of egg-laying | Sample group | 83.0 | 87.2 | 91.5 | 91.5 | 83.0 |
| | Control group | 83.7 | 87.8 | 87.8 | 89.8 | 79.6 |
| | Date of collecting eggs | 20 | 21 | 22 | 23 | 24 |
| Percentage of egg-laying | Sample group | 91.5 | 87.2 | 80.9 | 91.5 | 87.2 |
| | Control group | 77.6 | 81.6 | 77.6 | 83.7 | 81.6 |
| | Date of collecting eggs | 25 | 26 | 27 | 28 | Average |
| Percentage of egg-laying | Sample group | 78.7 | 80.9 | 91.5 | 87.2 | 86.6 |
| | Control group | 77.6 | 83.7 | 79.6 | 73.5 | 81.8 |

EXPERIMENT 3

This experiment was carried out for the purpose of examining the change of the fatty acid composition in the lipid of the yolk of eggs laid by hens to which the feed mixed with the compound for a poultry feed had been fed.

1) Preparation of a Sample

A compound for a poultry feed prepared according to the same method as in Example 1 was mixed uniformly with a commercially available poultry feed (manufactured by Toyohashi Shiryo) at a ratio of 5.0% to prepare a sample feed.

2) Method of the Experiment

To 100 of 316-day-old white leghorn egg-laying hens were fed the sample feeds for 30 days. Regarding eggs collected after 6 days, 10 days and 30 days from the starting of feeding, the fatty acid composition in the lipid of the yolk was measured and compared with that of eggs before the feeding of the sample feed.

The analysis of the fatty acid composition in the lipid of the yolk was performed according to gas chromatography by extracting the lipid with a mixed solution of chloroform and methanol (2:1), and methyl-esterifying it by an ordinary method.

3) Results of the Experiment

The results of the experiment are as shown in Table 3. As is apparent from Table 3, it was revealed that, regarding the eggs collected after 30 days, the contents of α-linolenic acid ($C_{18:3}$) and docosahexaenoic acid ($C_{22:6}$) are about 20 times and about 2.5 times respectively those of the eggs before the feeding of the sample feed. Incidentally, even when experiments were carried out, changing the compounding ratios of the compound for a poultry feed, almost equivalent results were obtained.

TABLE 3

Change of the Fatty Acid Composition in the Lipid of the Yolk

| | | Before feeding | Number of days after feeding | | |
|---|---|---|---|---|---|
| | | | 6 days | 10 days | 30 days |
| Content of fatty acids in the lipid of the yolk % | $C_{14:0}$ | 0.3 | 0.3 | 0.3 | 0.3 |
| | $C_{16:0}$ | 23.6 | 23.1 | 23.0 | 22.5 |
| | $C_{16:1}$ | 2.7 | 2.4 | 2.9 | 2.5 |
| | $C_{18:0}$ | 9.8 | 11.5 | 10.3 | 11.2 |
| | $C_{18:1}$ | 43.6 | 42.6 | 41.3 | 40.4 |
| | $C_{18:2}$ | 15.1 | 12.8 | 13.1 | 13.7 |
| | $C_{18:3}$ | 0.3 | 4.2 | 6.0 | 6.4 |
| | $C_{20:4}$ | 1.8 | 1.3 | 0.9 | 0.8 |
| | $C_{20:6}$ | 0.6 | 0.9 | 1.4 | 1.5 |
| | Others | 2.2 | 0.9 | 0.8 | 0.7 |

EXPERIMENT 4

This experiment was carried out for the purpose of examining the effect upon the fatty acid composition in the lipid of the yolk by the compound for a poultry feed of the present invention and linseed.

1) Preparation of Samples

The compound for a poultry feed of the present invention prepared according to the same method as in Example 1 was compounded with a commercially available poultry feed (manufactured by Toyohashi Shiryo) at a ratio of 5% was used as Feed 1, the same commercially available feed having linseed compounded therewith at a ratio of 10% was used as Feed 2, and the same commercially available feed with nothing mixed therein was used as Control Feed. Feed 1 and Feed 2 are adjusted so that they have the same amount of the lipid component compounded therewith.

2) Method of the Experiment 86 of 385-day-old Rhode Island Red egg-laying hens were divided into 4 groups, that are a group of 19 (A group), a group of 20 (B group), a group of 24 (C group) and a group of 23 (D group). Every 2 weeks, to A group were fed Control Feed—Feed 1—Control Feed, to B group were fed Feed 1—Control Feed—Feed 1, to C group were fed Control Feed—Feed 2—Control Feed, and to D group were fed Feed 2—Control Feed—Feed 2, by turns.

The analysis of the fatty acid composition in the lipid of the yoke was performed according to the same method as in Experiment 3 regarding the eggs collected after 12 days, 26 days and 40 days from the starting of the experiment.

3) Results of the Experiment

The results of the experiment are as shown in Table 4. As is apparent from Table 4, it was revealed that, regarding the eggs laid while Feed 1 and Feed 2 were fed, the contents of α-linolenic acid ($C_{18:3}$) and docosahexaenoic acid ($C_{22:6}$) in the lipid of the yolk increase significantly. However, while the average content of α-linolenic acid among A group of 26 days after, B group of 12 days after and 40 days after to which Feed 1 was fed is 4.2%, that of C group of 26 days after, D group of 12 days after and 40 days after to which Feed 2 was fed is only 1.9%, and thus it was revealed that long-chain unsaturated fatty acid calcium salts increases more remarkably the content of α-linolenic acid in the lipid of the yoke than linseed. Incidentally, even when experiments were carried out, changing the compounding ratios of long-chain unsaturated fatty acid calcium salts, almost equivalent results were obtained.

TABLE 4

Effect upon the Fatty Acid Composition in the Lipid of the Yolk

| | Date of collecting eggs | Fatty acid content in the lipid of the yolk % | | | | |
|---|---|---|---|---|---|---|
| | | $C_{14:0}$ | $C_{16:0}$ | $C_{16:1}$ | $C_{18:0}$ | $C_{18:1}$ |
| A | 12 | 0.3 | 23.9 | 3.5 | 8.1 | 47.5 |
| | 26 | 0.3 | 21.2 | 3.3 | 8.7 | 46.3 |
| | 40 | 0.4 | 24.3 | 3.7 | 8.3 | 46.8 |
| B | 12 | 0.3 | 22.0 | 3.4 | 9.0 | 46.1 |
| | 26 | 0.4 | 24.6 | 4.1 | 8.0 | 48.4 |
| | 40 | 0.3 | 21.5 | 3.3 | 8.7 | 46.4 |
| C | 12 | 0.4 | 24.5 | 3.9 | 7.6 | 49.6 |
| | 26 | 0.3 | 22.7 | 3.8 | 7.6 | 47.1 |
| | 40 | 0.3 | 24.3 | 4.0 | 8.1 | 47.4 |
| D | 12 | 0.3 | 23.2 | 3.4 | 8.0 | 48.1 |
| | 26 | 0.3 | 24.7 | 3.8 | 8.2 | 49.3 |
| | 40 | 0.3 | 22.9 | 3.7 | 7.5 | 46.4 |

| | Date of collecting eggs | Fatty acid content in the lipid of the yolk % | | | |
|---|---|---|---|---|---|
| | | $C_{18:2}$ | $C_{18:3}$ | $C_{20:4}$ | $C_{22:6}$ |
| A | 12 | 11.2 | 0.2 | 2.4 | 1.0 |
| | 26 | 10.6 | 4.6 | 1.4 | 2.0 |
| | 40 | 11.1 | 0.4 | 2.0 | 1.4 |
| B | 12 | 11.5 | 4.0 | 1.2 | 1.9 |
| | 26 | 9.6 | 0.3 | 1.7 | 1.2 |
| | 40 | 11.2 | 3.9 | 1.2 | 2.0 |
| C | 12 | 9.5 | 0.2 | 1.7 | 0.7 |
| | 26 | 11.0 | 2.0 | 1.7 | 0.9 |
| | 40 | 10.8 | 0.3 | 2.0 | 0.9 |
| D | 12 | 10.8 | 1.5 | 1.6 | 2.0 |
| | 26 | 9.2 | 0.2 | 1.7 | 0.9 |
| | 40 | 12.4 | 2.1 | 1.6 | 1.9 |

EXPERIMENT 5

This experiment was carried out for the purpose of examining the effect upon the content of α-linolenic acid in the lipid of the yolk by the compounding ratios of a long-chain unsaturated fatty acid calcium salt.

1) Preparation of Samples

The long-chain unsaturated fatty acid calcium salt prepared according to the same method as in Example 2 was mixed uniformly with a commercially available poultry feed (manufactured by Toyohashi Shiryo) at ratios of 1%, 2% and 6% to prepare feed samples. Incidentally, the same commercially available feed with no long-chain unsaturated fatty acid calcium salt mixed was used as a control feed.

2) Method of the Experiment 40 of 411-day-old white leghorn egg-laying hens were divided into 4 groups and to each group were fed the above 4 feeds. Eggs were collected after 1, 2, and 4 weeks from the starting of the feeding and the content of α-linolenic acid in the lipid of the yoke was measured according to the same method as in Experiment 3. Incidentally, the same experiment was carried out regarding the eggs of each group before the starting of the feeding.

3) Results of the Experiment

The results of the experiment are as shown in Table 5. As is apparent from Table 5, it was revealed that the content of α-linolenic acid in the lipid of the yolk increases with the increase of the compounding amount of the long-chain unsaturated fatty acid calcium salt with the feed.

Incidentally, since this experiment is a preparatory one, the specific range of the compounding amount of the long-chain unsaturated fatty acid calcium salt with the feed is not clear, but the range is determined as above from the experiment to be described later.

TABLE 5

Effect upon the Content of α-Linolenic Acid

| Adding amount % | 0 | 1 | 2 | 6 |
| --- | --- | --- | --- | --- |
| Before feeding | 0.3 | 0.3 | 0.3 | 0.3 |
| 1 week after | 0.5 | 1.0 | 2.4 | 4.3 |
| 2 weeks after | — | 1.1 | 3.0 | 5.7 |
| 4 weeks after | 0.3 | 1.2 | 2.3 | 5.0 |

(Note)
Numerical values show the contents of α-linolenic acid.

EXPERIMENT 6

This experiment was carried out for the purpose of examining the conditions of the internal organs of the poultry to which the compound for poultry feeds according to the present invention was fed for a long period of time.

1) Preparation of a Sample

The feed prepared according to the same method as in Example 1 was used as a sample feed, and a commercially available poultry feed (manufactured by Toyohashi shiryo) was used as a control feed.

2) Method of the Experiment 200 of 316-day-old white leghorn egg-laying hens were divided into two groups, and the sample feed and the control feed were fed to them for 91 days. After 92 days from the starting of feeding, two hens were picked up from each group at random, bled to death and anatomized, and various organs in the abdomen were observed with the naked eye.

3) Results of the Experiment

There was found no difference in the content of the fat in the abdomen between the group to which the sample feed had been fed and the group to which the control feed had been fed, and there was found nothing abnormal in other organs except the liver. However, as a result of the judgment based on the judgment standard according to Katsuyuki Tsuruta et al. [Report by Kumamoto Prefecture Poultry Farming Laboratory, 1986 Report by Laboratory (Kumamoto-ken Yokei Shikenjyo Hokoku. Showa-61-nendo Shikenkenkyu Hokoku), vol. 24, page 58, 1986], the third-level fatty liver was found in two hens to which the control feed had been fed. On the contrary, regarding the group to which the sample feed had been fed, there was found nothing abnormal in the liver of two hens though the content of fat in the feed was large.

Since it is reported that the percentage of egg-laying generally decreases when egg-laying hens suffer from the fatty liver, it can be guessed from the above results of the experiment that the compound for poultry feeds according to the present invention extends the egg-laying period by preventing the fatty liver. Incidentally, even when experiments were carried out, changing the kinds and the compounding ratios of long-chain unsaturated fatty acid calcium salts, almost equivalent results were obtained.

EXPERIMENT 7

This experiment was carried out for the purpose of examining preferable compounding ratios of the compound for poultry feeds according to the present invention with a poultry feed.

1) Preparation of Samples 5 kinds of sample feeds containing the long-chain unsaturated fatty acid calcium salt of linseed oil at ratios shown in Table 6 were prepared according to the same method as in Example 2. In addition, a sample feed containing an fatty acid calcium salt at a ratio of 5% prepared according to the same method as in Referential Example 1 except that MCT oil (manufactured by Taiyo Yushi K. K.) was used was prepared. As a control feed, a commercially available poultry feed (manufactured by Toyohashi Shiryo) without the compound for a poultry feed.

2) Method of the Experiment 161 of 320-day-old white leghorn egg-laying hens were divided into 7 groups and each feed was fed to them for 4 weeks. The increasing values (%) of the percentage of egg-laying were calculated from the differences between the average percentage of egg-laying of each group for 1 week from the starting of the experiment and that of each group for 1 week after 4 weeks from the starting of the experiment and compared.

3) Results of the Experiment

The results of the experiment are as shown in Table 6. As is apparent from Table 6, the increasing value of the percentage of egg-laying of the group to which the sample feed containing the long-chain unsaturated fatty acid calcium salt of linseed oil at a ratio of less than 0.5% had been fed and that of the group to which the sample feed containing the fatty acid calcium salt of MCT oil at a ratio of 5% had been fed were almost equivalent to that of the control group. On the contrary, the groups (from the 3rd group to the 6th group) to which the sample feeds containing the long-chain unsaturated fatty acid calcium salt of linseed oil at ratios of 0.5–10.0% had been fed had higher increasing values of the percentage of egg-laying than that of the control group, and particularly the 4th and the 5th groups showed remarkably high values. It is undesirable from the physiological viewpoint of poultry to add the long-chain unsaturated fatty acid calcium salt of linseed oil at a ratio of more than 10.0% to a poultry feed since the energy of the feed would become too high. Accordingly, in the present invention, a long-chain unsaturated fatty acid calcium salt is added to poultry feeds at ratios of 0.5–10.0%. Incidentally, even when experiments were carried out, changing the kinds of long-chain unsaturated fatty acid calcium salts, almost equivalent results were obtained.

TABLE 6

Effect by Compounding Ratios

| Group | Kind of compound | Ratio of compound | Increasing value of % of egg-laying (%) |
|---|---|---|---|
| 1st group | Nil (control) | 0 | 5.6 |
| 2nd group | Long-chain fatty acid calcium salt of linseed oil | 0.25 | 5.7 |
| 3rd group | Long-chain fatty acid calcium salt of linseed oil | 0.5 | 6.2 |
| 4th group | Long-chain fatty acid calcium salt of linseed oil | 2.5 | 7.5 |
| 5th group | Long-chain fatty acid calcium salt of linseed oil | 5.0 | 11.8 |
| 6th group | Long-chain fatty acid calcium salt of linseed oil | 10.0 | 6.5 |
| 7th group | Fatty acid calcium salt of MCT oil | 5.0 | 5.1 |

REFERENTIAL EXAMPLE 1

To a solution of an fatty acid alkaline soap obtained by saponifying 5 kg of soybean oil (manufactured by Taiyo Yushi K. K.) were added 10 l of an aqueous solution of 1 kg of calcium chloride dissolved gradually to react, and the reaction mixture was left to stand to be separated into a layer of an fatty acid calcium salt and a layer of water. The layer of an fatty acid calcium salt was separated, washed with water, dehydrated and dried to obtain about 4.4 kg of a powder of a long-chain unsaturated fatty acid calcium salt.

REFERENTIAL EXAMPLE 2

To 5 kg of linseed oil (manufactured by Taiyo Yushi K. K.) were added 0.82 kg of calcium hydroxide and mixed uniformly. 1 l of water having 3.65 g of Lipase PL-266 (manufactured by Meito Sangyo) dispersed therein was added therein, and the resultant mixture was mixed and stirred at normal temperature for about 30 minutes and left to stand for 30 hours to react. The reaction product was crushed according to an ordinary method to produce about 6.5 kg of a powder of a long-chain unsaturated fatty acid calcium salt.

BEST EMBODIMENTS FOR CARRYING OUT THE PRESENT INVENTION

Hereinafter, the present invention is described in more detail according to Examples. However, it should be noted that the present invention is not restricted to the following Examples.

EXAMPLE 1

19.5 kg of a long-chain unsaturated fatty acid calcium salt of linseed oil prepared according to the same method as in Referential Example 2 and 1 kg of a commercially available molasses (manufactured by Mitsui Seito) were mixed uniformly by means of a mixer (manufactured by Aikosha) to produce about 20 kg of a compound for poultry feeds.

EXAMPLE 2

46 kg of a long-chain unsaturated fatty acid calcium salt of linseed oil prepared according to the same method as in Referential Example 2 and 5 kg of a commercially available caramel DX50 (manufactured by Ikeda Toka) were mixed uniformly by means of a mixer (manufactured by Aikosha) to produce about 50 kg of a compound for poultry feeds.

EXAMPLE 3

To 24.5 kg of a long-chain unsaturated fatty acid calcium salt of soybean oil prepared according to the same method as in Referential Example 1 were added 3 kg of a commercially available molasses (manufactured by Mitsui Seito) and 3 kg of a commercially available caramel DX50 (manufacture d by Ikeda Toka) and were mixed uniformly by means of a mixer (manufactured by Aikosha) to produce about 30 kg of a compound for poultry feeds.

EXAMPLE 4

To 10 kg of a commercially available palm oil (manufactured by Taiyo Yushi K. K.) were added 1.8 kg of calcium hydroxide, 0.65 kg of a commercially available molasses (manufactured by Mitsui Seito) and 0.65 kg of alfalfa meal and mixed uniformly. 1.8 l of water having 8 g of Lipase PL-266 (manufactured by Meito Sangyo) dispersed therein were added therein, and the resultant mixture was mixed and stirred at normal temperature for about 30 minutes and left to stand for 30 hours to react. The reaction product was crushed according to an ordinary method to produce about 14.5 kg of a compound for poultry feeds.

EXAMPLE 5

To 57 kg of a commercially available poultry feed (manufactured by Toyohashi Shiryo) were added 3 kg of a compound for poultry feeds prepared according to the same method as in Example 1 except that linseed oil was used and mixed uniformly to produce about 60 kg of a poultry feed containing the compound for poultry feeds.

The feed was fed to 100 of 316-day-old white leghorn egg-laying hens for 50 days according to an ordinary manner. As a result of examining the percentage of breakage of eggs before and after the feeding of the feed, that of before feeding was 1.9% and that of after feeding was 0.5%, and thus the percentage of breakage of eggs reduced remarkably due to the feeding of the feed.

EXAMPLE 6

To 95 kg of a commercially available poultry feed (manufactured by Toyohashi Shiryo) were added 5 kg of a compound for poultry feeds prepared according to the same method as in Example 2 and mixed uniformly to produce about 100 kg of a poultry feed containing the compound for poultry feeds. The feed was fed to 100 of 316-day-old white leghorn egg-laying hens for 50 days according to an ordinary manner. As a result of examining the contents of linoleic acid and α-linolenic acid in the lipid of the yoke of eggs before and after the feeding of the feed according to the same manner as in Experiment 3, while the contents of linoleic acid and α-linolenic acid regarding the eggs laid before the feeding of the feed were 14.6% and 0.3% respectively, those of the eggs laid after the feeding of the feed were 14.1% and 5.6% respectively, and thus, though the content of linoleic acid reduced a bit due to the feeding of the feed, the content of α-linolenic acid increased to about 19 times.

POSSIBILITIES OF INDUSTRIAL UTILIZATION OF THE PRESENT INVENTION

The possibilities of industrial utilization of the present invention are as follows.

Namely, it can improve the percentage of egg-laying of poultry and at the same time can extend the egg-laying period.

In addition, it can reduce the percentage of breakage of eggs laid remarkably and improve the productivity.

Moreover, it can fortify long-chain unsaturated fatty acids such as linolenic acid and docosahexaenoic acid in the lipid of the yolk of eggs.

As described above, the present invention was explained in detail according to the concrete descriptions of Experiments and Examples. The present invention may be altered or modified to some extent appropriately in the scope of claims for a patent.

Further, as used herein throughout the present specification, the phrase "long-chain unsaturated fatty acid calcium salts" means long-chain unsaturated fatty acid calcium salts consisting essentially of fatty acid calcium salts having at least 18 carbon atoms.

What is claimed is:

1. A compound for poultry feeds, which comprises long-chain unsaturated fatty acid calcium salts consisting essentially of fatty acid calcium salts having at least 18 carbon atoms, and a material selected from the group consisting of a molasses, a browning material formed heating a saccharide, and a browning material formed by heating a saccharide and amino acids; at a weight ratio of the fatty acid calcium salts to the material of about 90:10 to 99.5:0.5.

2. The compound of claim 1, wherein said long-chain unsaturated fatty acid calcium salts are calcium salts of fatty acids containing linoleic acid, α-linolenic acid, docosahexaenoic acid or a mixture thereof.

3. The compound of claim 1, wherein said browning material formed by heating a saccharide is caramel.

4. A method for feeding poultry, which comprises:

a) mixing a compound comprising long-chain unsaturated fatty acid calcium salts consisting essentially of fatty acid calcium salt having at least 18 carbon atoms, and a material selected from the group consisting of a molasses, a browning material formed by heating a saccharide, and a browning material formed by heating a saccharide and amino acids; at a weight ratio of the fatty acid calcium salts to the material of about 90:10 to 99.5:0.5, with the poultry feed at least 0.5% by weight in terms of the long-chain unsaturated fatty acid calcium and b) feeding the resultant mixture to poultry.

5. The method of claim 4, wherein said long-chain unsaturated fatty acid calcium salts are calcium salts of fatty acids containing linoleic acid, α-linolenic acid, docosahexaenoic acid or a mixture thereof.

6. The method of claim 4, wherein said browning material formed by heating a saccharide is caramel.

* * * * *